United States Patent [19]

Blinne et al.

[11] 4,324,881
[45] Apr. 13, 1982

[54] PREPARATION OF AMIDE-CONTAINING POLYETHERS

[75] Inventors: Gerd Blinne, Bobenheim; Rolf Wurmb, Heidelberg; Franz Schmidt, Mannheim, all of Fed. Rep. of Germany

[73] Assignee: BASF Aktiengesellschaft, Fed. Rep. of Germany

[21] Appl. No.: 185,606

[22] Filed: Sep. 9, 1980

[30] Foreign Application Priority Data

Oct. 4, 1979 [DE] Fed. Rep. of Germany ....... 2940190

[51] Int. Cl.$^3$ .............................................. C08G 65/40
[52] U.S. Cl. .................................... 528/173; 528/208; 528/210
[58] Field of Search ...................... 528/173, 208, 210

[56] References Cited

U.S. PATENT DOCUMENTS 3,505,288  4/1970  Bodesheim et al.
3,634,355  1/1972  Barr et al.

FOREIGN PATENT DOCUMENTS 847963   7/1970  Canada.
2557652  6/1977  Fed. Rep. of Germany.
1078234  8/1967  United Kingdom.
1264900  2/1972  United Kingdom.

*Primary Examiner*—Maurice J. Welsh

*Attorney, Agent, or Firm*—Keil & Witherspoon

[57] ABSTRACT

A process for the preparation of an amide-containing polyether comprises polycondensing a dihalobenzene compound, preferably bis-(4-chlorophenyl) sulfone or 4,4'-bis-(4''-chlorobenzoyl)-diphenyl ether, with an amide-containing bis-phenol of the formula HO-Ar$^1$-NHCO-Ar$^2$-CONH-Ar$^1$-OH where Ar$^1$ is an aromatic radical of 6 to 12 carbon atoms and Ar$^2$ is an aromatic radical of 6 to 12 carbon atoms or has the formula II

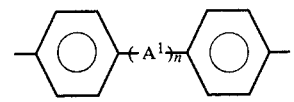

where A$^1$ is —SO$_2$—, —CO—, —C(CH$_3$)$_2$— or 0 and n is 0 or 1, preferably 1,4-bis(4-hydroxybenzamido)-benzene, in the presence of an anhydrous alkali metal carbonate, and optionally in the presence of a bisphenol of the formula III

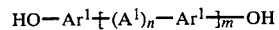

where Ar$^1$ and A$^1$ have the above meanings and n and m are 0 or 1. The polyethers may be used to produce moldings, fibers, films, adhesives and coating materials.

6 Claims, No Drawings

PREPARATION OF AMIDE-CONTAINING POLYETHERS

The present invention relates to a process for the preparation of amide-containing polyethers, especially amide-containing polyether-sulfones.

Polymers containing sulfone groups and ether groups have been disclosed. According to British Pat. No. 1,078,234, linear polyarylene-polyethers are prepared by reacting alkali metal double salts of dihydric mononuclear or dinuclear phenols with an equimolar amount of a mononuclear benzene compound containing two halogen atoms and having one or more electronattracting groups in the o- or p-position under anhydrous conditions in a liquid phase in the presence of a sulfoxide or sulfone as the solvent.

According to British Pat. No. 1,264,900 and Canadian Pat. No. 847,963, polysulfone-ethers are prepared from phenolates and aromatic dihalogen compounds in the presence of a polar high-boiling solvent and of an anhydrous alkali metal carbonate, preferably potassium carbonate.

According to U.S. Pat. No. 3,634,355, polyethersulfones are also obtained by condensing an alkali metal salt of a 4-(4-halophenylsulfonyl)-phenol at above 150° in the absence of any diluent or solvent which might react under the conditions used.

These polymers have the disadvantage that they contain certain functional groups or bonds which render them sensitive, at high temperatures, to acids or alkalis and to numerous organic chemicals and solvents.

Aromatic polyamides, containing sulfone groups and ether groups, which in part do not suffer from these disadvantages, have also been disclosed, for example in U.S. Pat. No. 3,505,288 and German Laid-Open Application DOS No. 2,557,652. In the case of the products of U.S. Pat. No. 3,505,288, the polycondensation must be carried out with acid chlorides, which are difficult to handle, and the starting substances cannot be used as comonomers in the previously mentioned processes for the preparation of polyether-sulfones. The monomers used in German Laid-Open Application DOS No. 2,557,652 have a diminished reactivity, which as a rule leads to polymers with lower degrees of condensation, unless more severe reaction conditions are used, which in turn cause discolorations of the polymers.

The present invention seeks to provide for the preparation of amide-containing polyethers by using more easily obtainable, highly reactive monomers, without having to modify the established processes for the preparation of polyether-sulfones, with the aim of being able to employ such monomers also for the synthesis of various copolymers and block copolymers by the conventional processes for the preparation of polyethersulfones.

We have found that good results may be achieved by polycondensing substantially equivalent amounts of one or more bisphenols with one or more dihalobenzene compounds in the presence of an anhydrous alkali metal carbonate, if one or more amidecontaining bisphenols of the formula

$$HO-Ar^1-NHCO-Ar^2-CONH-Ar^1-OH \quad (I)$$

where $Ar^1$ is an aromatic radical of 6 to 12 carbon atoms and $Ar^2$ has the meanings of $Ar^1$ or has the formula

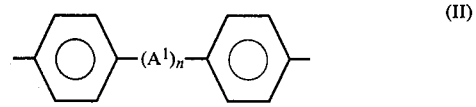

where A is $-SO_2-$, $-CO-$, $-C(CH_3)_2-$ or $-O-$ and n is 0 or 1, are used for the polycondensation.

Examples of suitable bisphenols I are compounds of the formulae VII to XIII

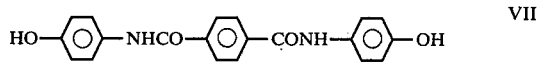
VII
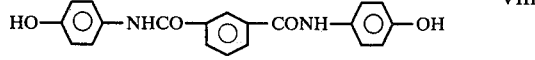
VIII
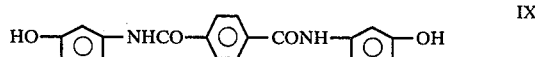
IX
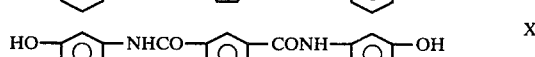
X
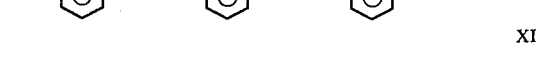
XI
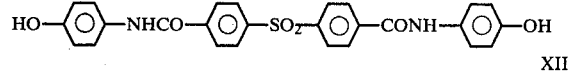
XII
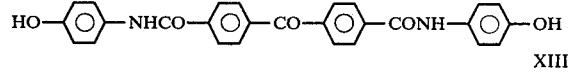
XIII
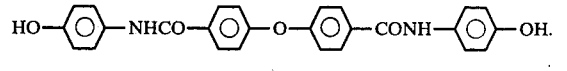
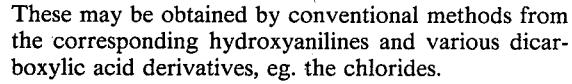

These may be obtained by conventional methods from the corresponding hydroxyanilines and various dicarboxylic acid derivatives, eg. the chlorides.

Further bisphenols which are suitable in conjunction with the bisphenols of formula I for the preparation of high molecular weight amide-containing copolyethers are those of the formula

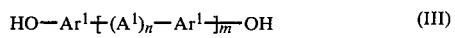

$$HO-Ar^1+(A^1)_n-Ar^1\overline{\smash{)}_m}-OH \quad (III)$$

where $Ar^1$ is an aromatic radical of 6 to 12 carbon atoms, $A^1$ is a divalent radical selected from $-C(CH_3)_2-$, $-O-$, $-CO-$ and, preferably, $-SO_2-$, and n and m are 0 or 1.

Examples of such bisphenols are hydroquinone, resorcinol, 4,4'-bisphenol, 2,2-bis-(4'-hydroxyphenyl)-propane, bis-(4-hydroxyphenyl) ketone and, preferably, bis-(4-hydroxyphenyl) sulfone.

The said bisphenols may be used individually or as mixtures with one another. The preferred compound to use is bis-(4-hydroxyphenyl) sulfone.

When preparing block copolymers, it may be of advantage first to allow the amide-containing bisphenol to react completely with the dihalobenzene compound and only then to add one or more other bisphenols. Of course, the bisphenols can also be added in converse sequence.

Examples of dihalobenzene compounds which may be used are derivatives of the formulae

IV

-continued

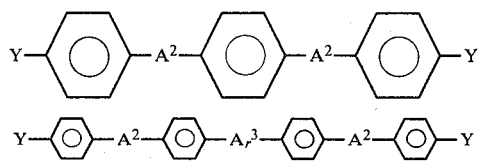

V

Y—⟨O⟩—A²—⟨O⟩—A,³—⟨O⟩—A²—⟨O⟩—Y  VI where Y is —F or preferably —Cl, A² is —CO— or preferably —SO₂—, A³ is —O— or —S— and r is 0 or 1.

Examples of such dihalobenzene compounds are bis-(4-chlorophenyl) sulfone, bis-(4-fluorophenyl) sulfone, bis-(4-chlorophenyl) ketone, 1,4-bis-(4'-chlorobenzoyl)-benzene, 1,4-bis-(4'-chlorobenzenesulfonyl)-benzene, 4,4'-bis-(4''-chlorobenzoyl)-diphenyl ether, 4,4'-bis-(4''-chlorobenzoyl)-diphenyl sulfide, 4,4'-bis-(4''-chlorobenzoyl)-diphenyl, 4,4'-bis-(4''-chlorobenzenesulfonyl)-diphenyl ether, 4,4'-bis-(4''-chlorobenzenesulfonyl)-diphenyl sulfide and 4,4'-bis-(4''-chlorobenzenesulfonyl)-diphenyl. The dihalobenzene compounds may also be used individually or as mixtures with one another. Preferred compounds to use are bis-(4-chlorophenyl) sulfone, 4,4'-bis-(4''-chlorobenzoyl)-diphenyl ether and mixtures of these.

Examples of anhydrous alkali metal carbonates are sodium carbonate and preferably potassium carbonate, or mixtures of these.

The process according to the invention may be carried out by reacting 1 mole of bisphenol or bisphenol mixture with from 0.9 to 1.1 moles, preferably with about one mole, of dihalobenzene compound and from 1.0 to 2.2 moles, preferably from 1.1 to 2.0 moles, of anhydrous alkali metal carbonate, preferably potassium carbonate, preferably in the absence of a solvent, more especially in a melt, at from 200° C. to 400° C., preferably from 250° C. to 350° C., to give polyethers.

It may at times be advantageous to raise the reaction temperature, within the stated limits, as the condensation progresses.

The process according to the invention can be carried out in equipment made of materials which are insert toward the reactants, and which ensures satisfactory contact between the reactants at the requisite high reaction temperatures and permits the removal of volatile reaction products. For example, the kneaders or extruders conventionally used for polymers and possessing a device for removal of volatile constituents may be used.

The reaction mixture is polycondensed, within the stated temperature range, until the requisite degree of condensation is reached. The duration of polycondensation may be from 0.1 to 10 hours, preferably from 0.2 to 2 hours, depending on the nature of the starting components and on the chosen reaction conditions. All chemically inert groups are suitable end groups for the polycondensates. To incorporate the end groups, it is advantageous to add a small amount of an appropriate compound to the polycondensation mixture when the desired degree of polycondensation has been reached. Preferred compounds for providing the end groups are aliphatic and aromatic halogen compounds, especially methyl chloride and the above dihalobenzene compounds.

The inorganic constituents, for example sodium chloride or potassium chloride, can be removed by suitable methods, such as solution and filtration, sieving or extracting, before or after isolation of the polyether.

A second method of carrying out the novel process is to polycondense 1 mole of bisphenol with from 0.9 to 1.1 moles (preferably about 1 mole) of dihalozene compound and from 1.0 to 2.2 moles of anhydrous alkali metal carbonate in a polar aprotic solvent at from 150° C. to 300° C., preferably from 180° C. to 250° C.

Preferably, the water formed is removed in two stages, using a compound which forms an azeotrope with water.

The polar aprotic solvent used may be a compound chosen from amongst N-substituted acid amides, sulfoxides and sulfones, eg. N,N-dimethylformamide, N,N-dimethylacetamide, N-methylpyrrolidone, dimethyl sulfoxide, dimethyl sulfone, tetramethyl sulfone (sulfolan) and diphenyl sulfone, but is preferably N-methylpyrrolidone.

The polar, aprotic solvents are usually employed in amounts of from 5 to 100, preferably from 10 to 20, moles per mole of bisphenol or of dichlorobenzene compound. This means that in the absence of an alkali metal carbonate and of a compound which forms an azeotrope, the reaction solutions usually have a solids content of from 5 to 50% by weight, preferably from 20 to 35% by weight, based on the total weight of the solution.

Suitable compounds which form azeotropes with water are all substances which boil at around the reaction temperature under atmospheric pressure and can be mixed homogeneously with the reaction mixture without undergoing chemical reactions. Examples of azeotrope-forming substances of this type are chlorobenzene, toluene and xylene, of which the first-mentioned is preferred.

To carry out this process, the reaction mixture may be heated, in the first reaction stage, until not less than 90%, preferably from 90 to 96%, of the theoretically possible amount of water has been removed, the time required being advantageously from 0.5 to 4 hours, preferably from 1 to 2 hours.

In the second reaction stage, the reaction mixture is polycondensed until completely anhydrous and to achieve this further amounts of the azeotrope-forming substance are added constantly and at the same time the azeotropic mixture formed is distilled off. The reaction time in this stage is usually from about 0.5 to 4 hours, preferably from 1 to 2 hours.

In the third stage, wherein the material is polycondensed until the polyether has the desired viscosity, the reaction time is usually from about 3 to 12, hours, preferably from 4 to 8 hours. The polycondensation may then be stopped by introducing methyl chloride. The reaction time for this stoppage is from about 0.1 to 2 hours, preferably from 0.2 to 0.5 hour.

Finally, in the fourth stage, the polyether is isolated, and this may be done in various ways. Solid polymer can be separated out by mixing the reaction solution with a precipitant, for example water and/or methanol, mixing being effected by vigorous stirring, spraying or atomizing. On the other hand, the solvent can also be evaporated off. The inorganic constitutents can be removed from the polyether by suitable methods, such as dissolving and filtering, or sieving.

The polyethers prepared by means of the novel process usually have reduced viscosities (measured in 1% strength sulfuric acid solution at 23° C.) of from 0.4 to 1.5, preferably from 0.45 to 0.75. This corresponds to molecular weights of from about 16,000 to 120,000, preferably from 20,000 to 50,000. The polyethers obtained are exceptionally suitable for the production of moldings, fibers, films, adhesives and coating materials.

The Examples and Comparative Examples which follow illustrate the invention. Parts are by weight. The reduced viscosities ($\eta_{red}$) were measured in 1% strength sulfuric acid solution at 24° C. and were determined from the formula $$\eta_{red} = \frac{\eta_{spec}}{C}$$

EXAMPLE 1

209.0 parts of 1,4-bis-(4'-hydroxybenzamido)-benzene and 172.3 parts of bis-(4-chlorophenyl) sulfone are dissolved in 900 parts of N-methylpyrrolidone and 300 parts of chlorobenzene and 87.2 parts of anhydrous potassium carbonate are added. The reaction mixture is heated to 150° C. over two hours whist constantly distilling off a mixture of water and chlorobenzene. The temperature is then raised to 180° C. A further 300 parts of chlorobenzene are added dropwise in the course of a further two hours and are immediately distilled off again as an azeotrope. The reaction mixture is then kept at 180° C. for 12 hours. The polycondensation is stopped by introducing a stream of methyl chloride for 30 hours. After adding 600 ml of chlorobenzene, the inorganic constituents are filtered off and the polymer is precipitated in water, filtered off and dried for 12 hours at 80° C. under reduced pressure. It has a reduced viscosity $\eta_{red}=1.10$ and is insoluble in all conventional organic solvents.

EXAMPLE 2

348.5 parts of 1,4-bis-(4'-hydroxybenzamido)-benzene are mixed thoroughly with 276.4 parts of anhydrous potassium carbonate and the mixture is treated at 300° C. under reduced pressure until the calculated amounts of water and carbon dioxide have been removed (which requires about 3 hours). 287.2 parts of bis-4-(chlorophenyl) sulfone are then added and the polycondensation mixture is treated for a further 30 minutes at 300° C., with constant mixing. When a reduced viscosity of $\eta_{red}=0.65$ has been reached, a further 10 parts of bis-(4-chlorophenyl) sulfone are added. The polycondensation is complete after a further 30 minutes. To remove the inorganic salts, the polymer obtained is extracted with water. The polymer has a viscosity of $\eta_{red}=0.72$ and can be converted to moldings which are very heatresistant, have a slight intrinsic color and are insoluble in all conventional organic solvents.

EXAMPLES 3 to 10

The procedure followed is as described in Example 1, but using the monomers listed in the Table.

TABLE

| Example | Bisphenol (parts) | Comonomer (parts) | Dihalogen compound (parts) | $\eta_{red}$ (dl/g) | Solvent resistance+ |
|---|---|---|---|---|---|
| 3 | VIII (209.0) | 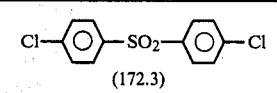 (172.3) | | 0.95 | very good |
| 4 | IX (209.0) | — | " | 1.00 | very good |
| 5 | X (209.0) | — | " | 0.90 | very good |
| 6 | XI (293.1) | — | " | 1.15 | very good |
| 7 | VII (104.5) | 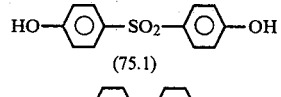 (75.1) | " | 0.65 | good |
| 8 | VII (104.5) | 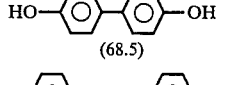 (68.5) | " | 0.60 | good |
| 9 | VII (41.8) | 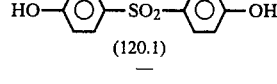 (120.1) | " | 0.55 | satisfactory |
| 10 | VII (209.0) | — | 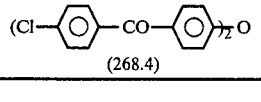 (268.4) | 0.55 | very good |

+tested in methylene chloride, acetone and chlorobenzene

COMPARATIVE EXAMPLE

The procedure described in Example 1 is followed, except that the 1,4-bis-(4-hydroxybenzamido)-benzene is completely replaced by 150.2 parts of bis-(4-hydroxyphenyl) sulfone. A high molecular weight polymer having a reduced viscosity $\eta_{red}=0.60$ is obtained after a mere 6 hours at 180° C., but the product is substantially soluble in methylene chloride, acetone and chlorobenzene and hence has insufficient solvent resistance for many applications.

We claim:
1. A process for the preparation of an amidecontaining polyether by polycondensing one or more bisphenols with one or more dihalobenzene compounds in substantially equivalent amounts in the presence of an anhydrous alkali metal carbonate, wherein one or more amide-containing bisphenols of the formula I

$$HO-Ar^1-NHCO-Ar^2-CONH-Ar^1-OH \qquad (I)$$

where $Ar^1$ is an aromatic radical of 6 to 12 carbon atoms and $Ar^2$ is an aromatic radical of 6 to 12 carbon atoms or has the formula II

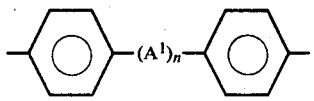 (II)

where $A^1$ is $-SO_2-$, $-CO-$, $-C(CH_3)_2-$ or $-O-$ and n is 0 or 1, are used for the polycondensation.

2. A process as claimed in claim 1, wherein one or more compounds of the formula III

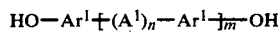 (III)

where $Ar^1$ and $A^1$ have the meanings given in claim 1 and n and m are 0 or 1, are used as additional bisphenols and a copolyether is obtained.

3. A process as claimed in claim 1 or 2, wherein the dihalobenzene compound used has the formula IV, V or VI

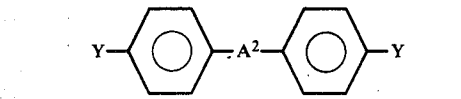 IV

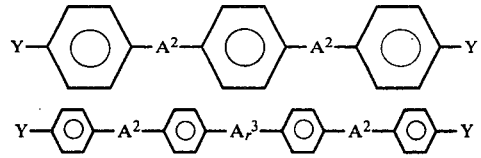 V

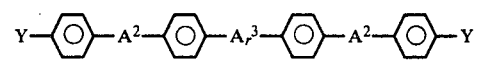 VI where Y is $-F$ or $-Cl$, $A^2$ is $-CO-$ or $-SO_2-$, $A^3$ is $-O-$ or $-S-$ and r is 0 or 1.

4. A process as claimed in claim 1, wherein sodium carbonate and/or potassium carbonate is used as the anhydrous alkali metal carbonate.

5. A process as claimed in claim 1, wherein 1 mole of bisphenol is polycondensed with from 0.9 to 1.1 moles of dihalobenzene compound and from 1.0 to 2.2 moles of anhydrous alkali metal carbonate in the absence of a solvent at from 200° C. to 400° C.

6. A process as claimed in claim 1, wherein 1 mole of bisphenol is polycondensed with from 0.9 to 1.1 moles of dihalobenzene compound and from 1.0 to 2.2 moles of anhydrous alkali metal carbonate in a polar aprotic solvent at from 150° C. to 300° C.

* * * * *